United States Patent
Shipp et al.

(10) Patent No.: US 7,584,209 B2
(45) Date of Patent: Sep. 1, 2009

(54) FLEXIBLE FILE FORMAT FOR UPDATING AN ADDRESS BOOK

(75) Inventors: Neil L. Shipp, Bellevue, WA (US); Victor E. Romano, North Bend, WA (US); Michael V. Sliger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 11/051,237

(22) Filed: Feb. 4, 2005

(65) Prior Publication Data

US 2006/0179066 A1    Aug. 10, 2006

(51) Int. Cl.
*G06F 17/00* (2006.01)

(52) U.S. Cl. .............. 707/103 Y; 707/10; 707/100; 707/102; 707/104.1; 707/203; 707/205; 709/206; 715/234

(58) Field of Classification Search .......... 707/100, 707/102, 104.1, 203, 205, 10, 103 Y; 709/206; 712/234

See application file for complete search history.

(56) References Cited

U.S. PATENT DOCUMENTS

| | | | | |
|---|---|---|---|---|
| 5,539,886 | A | * | 7/1996 | Aldred et al. ............... 719/318 |
| 5,717,863 | A | * | 2/1998 | Adamson et al. ............ 709/204 |
| 5,966,714 | A | | 10/1999 | Huang et al. |
| 6,148,329 | A | | 11/2000 | Meyer ........................ 709/206 |
| 6,389,386 | B1 | | 5/2002 | Hetherington et al. ......... 704/8 |
| 6,397,219 | B2 | * | 5/2002 | Mills .......................... 707/10 |
| 6,457,879 | B1 | | 10/2002 | Thurlow et al. |
| 6,694,336 | B1 | * | 2/2004 | Multer et al. ............... 707/201 |
| 6,829,607 | B1 | | 12/2004 | Tafoya et al. |
| 2001/0029455 | A1 | | 10/2001 | Chin et al. |
| 2002/0049610 | A1 | * | 4/2002 | Gropper ........................ 705/1 |
| 2002/0198951 | A1 | | 12/2002 | Thurlow et al. |
| 2003/0018723 | A1 | * | 1/2003 | Almeda et al. ............... 709/206 |
| 2003/0093483 | A1 | | 5/2003 | Allen et al. .................. 709/206 |
| 2003/0149776 | A1 | | 8/2003 | Tsunezumi ................. 709/228 |
| 2004/0107342 | A1 | * | 6/2004 | Pham et al. .................. 713/165 |

OTHER PUBLICATIONS

Kuhn, M. "UTF-8 and Unicode FAQ for Unix/Linux," Published 1999, 32 pages, http://www.ci.carn.ac.uk/~mgk25/unicode.html.
"Microsoft Internet Explorer 6 Public Preview Release Notes," Published 2001, pp. 1-9, http://www.activewin.com/articles/2001/ie6rdme.shtml.
International Standard ISO/IEC 880-3, Part 3: "Carrier Sense Multiple Access With Collision Detection (CSMA/CD) Access Method and Physical layer Specifications", p. 41: 3.2.8 Frame Check Sequence (FCS) field, IEEE Std 802.3, 2000 Edition.

* cited by examiner

*Primary Examiner*—Jean B Fleurantin
*Assistant Examiner*—Phong Nguyen
(74) *Attorney, Agent, or Firm*—Merchant & Gould P.C.

(57) ABSTRACT

Mechanisms for updating an address book. A first computing system generates an address book update file format and provides the file to a second computing system. The file format contains several data fields. One of the data fields consists of a configurable list of attribute property identifications. These property identifications represent address book information such as e-mail address, phone number, first name, surname, and the like. A second data field comprises contact data that includes at least some of the properties identified by the configurable list. Changes to the information contained in the address book update may be made by simply adding or deleting attribute property identifications. This has the effect of allowing modifications to the address book file format without having to generate a new file format.

17 Claims, 5 Drawing Sheets

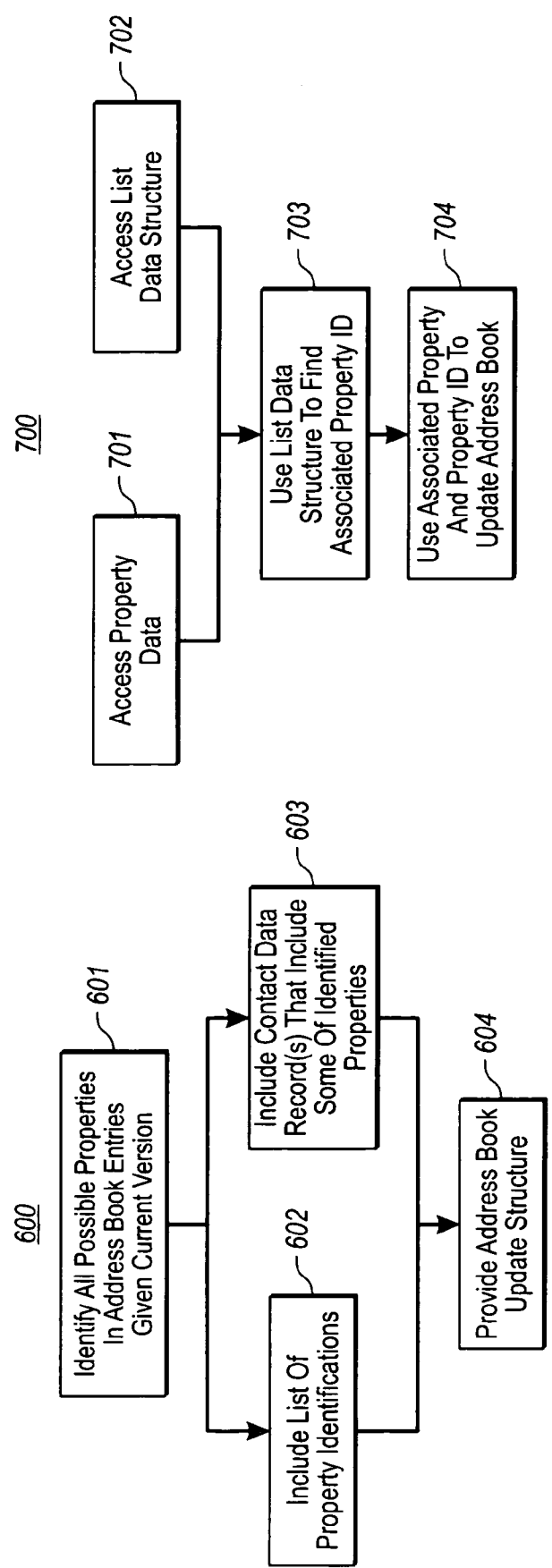

FLEXIBLE FILE FORMAT FOR UPDATING AN ADDRESS BOOK

CROSS-REFERENCE TO RELATED APPLICATIONS

Not applicable.

BACKGROUND OF THE INVENTION

1. The Field of the Invention

The present invention relates to computing technology. More specifically, the present invention relates to mechanisms for allowing the flexible update of address book information to a remote address book.

2. The Relevant Technology

Computing technology has revolutionized the way people work and play and has contributed enormously to the advancement of humankind. Computers now aid in enumerable applications such as word processing, computer simulations, advanced gaming, voice recognition, among much more. Computing systems now come in a wide-variety of forms including, for example, desktop computers, laptop computers, Personal Digital Assistants (PDAs), and even mobile telephones and devices.

Many computing systems are configured to support applications such as e-mail or instant messaging that implement an address book. The address book is used by a user of the application (or by the application itself) for a variety of purposes. For example, an e-mail application may use the information to distribute e-mail, or to present options for e-mail recipients, while an instant messaging application may use the information to decide on which participants will be given presence data about which participants. Regardless of the application, the address book allows for quick and easy access to the information stored in the address book.

There are many types of information or attributes that may be stored in an address book. Common examples include first name, surname, e-mail address, telephone number, office location, company title and the like. The information generally is used to assist a user whom is organizing contact information about specific individuals or groups of individuals. For example, an address book entry may list the e-mail address of a single individual or it may list the e-mail address of a group of individuals such as colleagues at work.

Typically, an address book is created and maintained on a server. The server ensures that the client computing systems ("client") have updated address books by periodically updating the client-side address books. In particular, the server generates an update file that represents a full or incremental update of the address book. The update file has a particular format for a given version of an address book. The update file is then provided to the appropriate clients. This is done so that multiple clients may have access to the attributes stored in the address book. Currently, the server generates a file format that hard codes a list of attributes into a file that the client can read. The client then decodes the file and provides the address book to a client user. Having the address book on the client allows a user to use the address book even when the client is not connected to the server.

It is often the case, however, that newer versions of address books use new attributes, and discontinue the use of old attributes. For example, suppose that an older version of an address book may contain only first name, surname, and e-mail address. A newer version is then developed that recognizes the need for a telephone number. In conventional technology, the update file for the older version of the address book had a particular dedicated file format that recognized that need for only the first name, surname, and e-mail address. A new file format would need to be developed to accommodate the new telephone number attribute. Also, the address book update software on both server and client would also need to be upgraded to recognize the new file format.

Generating a new file format every time a new attribute is needed can be time consuming. Large amounts of computing resources are consumed in the process as the newly generated file format must include all the desired attributes and not just the changed attribute. Therefore what would be advantageous would be an address book update mechanism with enough flexibility to allow attribute updates to an address book without the need to change the underlying file format should new attributes be introduced, or should old attributes become obsolete.

BRIEF SUMMARY OF THE INVENTION

The forgoing problems with the prior state of the art are overcome by the principles of the present invention, which relate to mechanisms and methods for updating an address book entry without changing underlying file format of the address book data structure. This allows for attributes to be added and deleted without the need for a new version of the address book.

The address book data structure includes a configurable table of attribute property identifications. These property identifications represent information in an address book entry. Examples of the information include e-mail address, phone number, first name, surname, and the like. The presence of a particular property identification in the data structure means that the related information may be present in the updated address book entry. For example, a data structure containing property identifications for telephone number and e-mail address means these two attributes may be present in the address book entry.

The configurable nature of the attributes table allows for flexible changes of information in the address book without changing the underlying format of the data structure. For example, if a new attribute is needed, then a new property identification can be added to the configurable attribute table. Similarly, if an attribute has become obsolete and needs to be removed from the address book, then the property identification for the obsolete attribute can be removed from the configurable attribute table.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 illustrates a flowchart of a method for a server to generate the address book update data structure of FIG. 2;

FIG. 7 illustrates a flowchart of a method for a client to interpret the address book update data structure during updating of the address book.

DETAILED DESCRIPTION OF THE PREFERRED EMBODIMENTS

Figure 1:
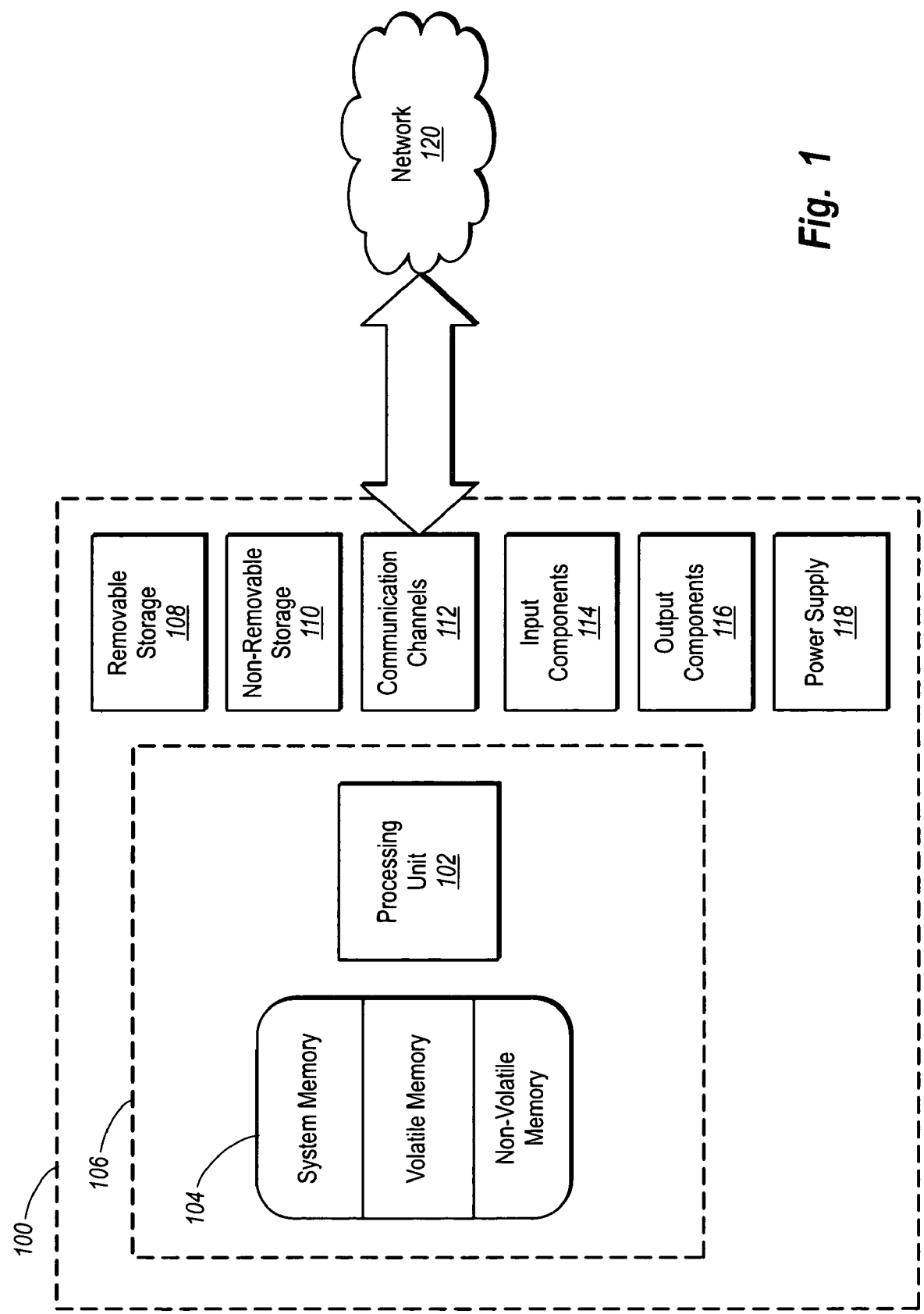
FIG. 1 illustrates a suitable computing environment that may implement the features of the present invention.

The principles of the present invention relate to mechanisms and methods for updating an electronic address book. A first computing system generates an address book update data structure and provides the address book update data structure to a second computing system. The update data structure contains several data fields. One of the data fields consists of a configurable list of attribute property identifications. These property identifications represent information that could be present in an address book entry given the current version of the address book. Such information may include, for example, e-mail address, phone number, first name, surname, and the like. A second data field comprises one or more update records, each corresponding to a particular address book entry. Any given update record contains update information for at least some of the properties identified in the configurable list.

If a new version of address book is introduced having different possible property identifications, the update data structure may be simply changed to reflect these new attributes in the configurable list. This allows updating in the context of new versions to be accomplished without changing the underlying format of the address book update data structure, and without changing the basic logic needed to generate and interpret the address book update data structure.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Although the network 120 may include any network type (whether now existing or to be developed in the future), examples include Token Ring, Ethernet, Bluetooth, 802.11, USB, 1394, SMS, SOAP over IP, or the like. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 8:
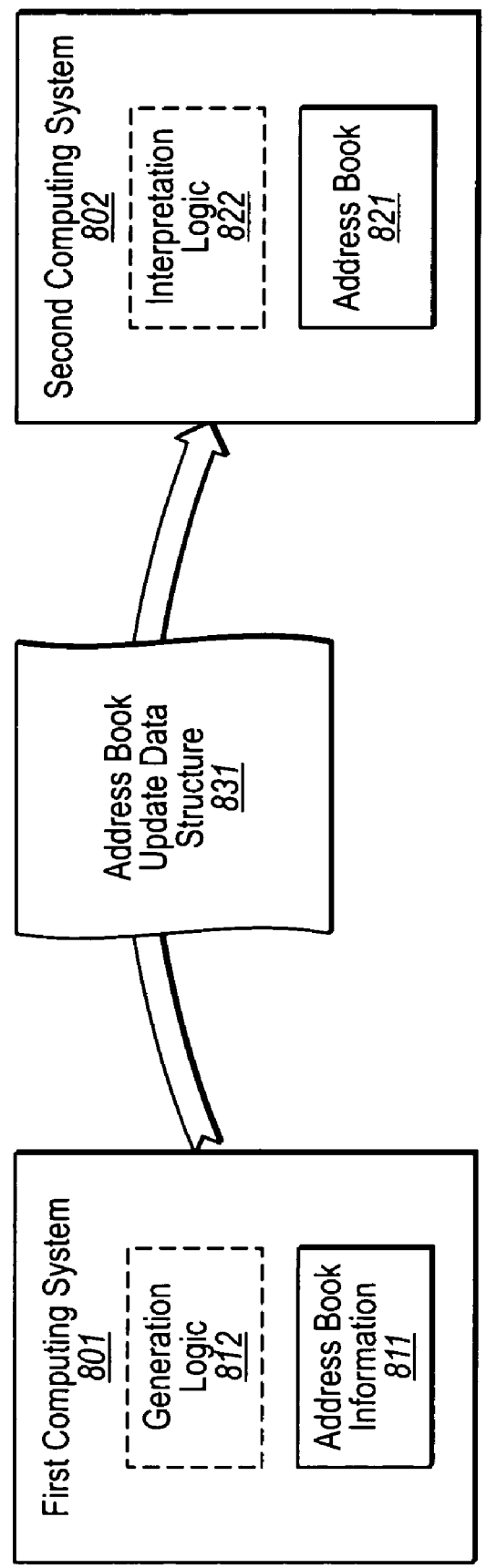
FIG. 8 illustrates a network environment in which the principles of the present invention may be employed.

FIG. 8 illustrates a network environment 800 in which the principles of the present invention may be employed. The network environment 800 includes a first computing system 801 and a second computing system 802, although, of course, other computing system may be coupled if desired. The first computing system 801 contains address book information 811 which is to be propagated to a second computing system 802 if appropriate.

To accomplish this, an optional generation logic component 812 generates an address book update data structure 831. The generation logic 812 may be implemented in software or hardware, or a combination of software and hardware. If the first computing system 801 were structured as described above for the computing system 100, then the generation logic 812 may be computer-executable instructions in the system memory 104 and executed by processor 102. However, the first computing system 801 may be any computing system that includes processing logic capable of implementing the principles of the present invention, and need not be as described above for computing system 100.

In one embodiment, the address book information 811 is structured the same as the address book update data structure 831. In that case, no generation logic 812 is strictly needed. However, if the address book information 811 is not similarly structured to the address book update data structure 831, some generation logic 812 would be used to generate the address book update data structure. For instance, the generation logic 812 may interpret which address book entries the second computing system 802 is interested in. The generation logic 812 may also determine which fields of these address book entries have (or are likely to have) changed since the second computing system 802 was last provided an address book update. The generation logic 812 would then generate an address book data structure 831 that is consistent with the principles of the present invention as will be described further below.

The second computing system 802 may (but need not) also be structured as described above for the computing system 100. The second computing system 802 includes interpretation logic 822 capable of interpreting the address book update data structure 831 to appropriate update its own address book 821. The interpretation logic 822 may also be implemented in software, hardware, or a combination of software and hardware. The interpretation logic 822 would not be needed if the address book update data structure were simply copied over the address book 821 to become the new updated address book.

Figure 2:
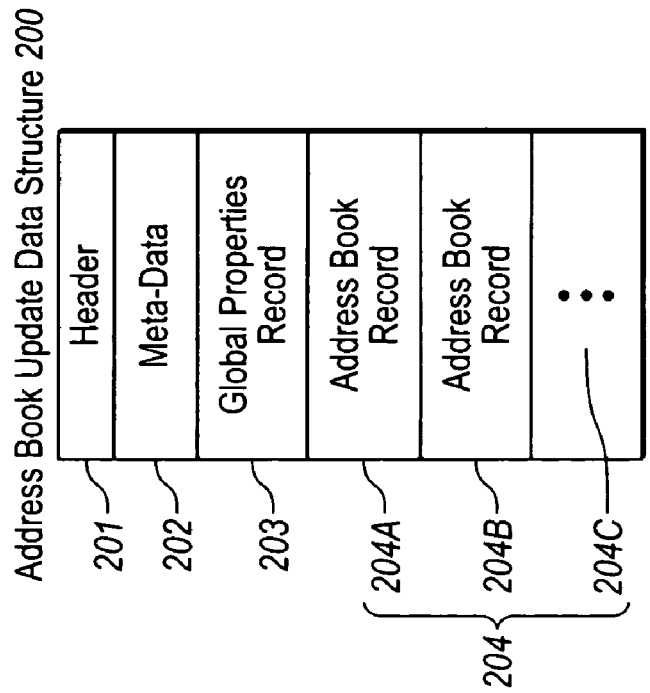
FIG. 2 illustrates a block diagram of an address book data structure in which the principles of the present invention may be employed.

FIG. 2 illustrates a schematic block diagram of an address book update data structure 200 that may represent one of many suitable data structures that may be used as the address book update data structure 831 of FIG. 8. In this specific implementation, the address book data structure 200 includes a header field 201, a meta-data field 202, a global properties record field 203 containing global information about the data structure, and address book record data fields 204 including address book update records 204A, 204B, and potentially more as represented by vertical ellipses 204C, each containing update information corresponding to an address book entry.

Address book update data structure 200 is generated by a server (e.g., the first computing system 801 in the case of FIG. 8) and may be sent to client computing systems (e.g., the second computing system 802 in the case of FIG. 8) as a full file update, or as an incremental update. The same format for the update data structure may be used in either case. The only difference would be that the update data structure would perhaps contain some indication of whether the update is full or incremental. In addition, the incremental update would include address book update records for only those address book entries that have changed in the case of an incremental update, whereas the full update would include address book update records for all address book entries. Each data field illustrated in FIG. 2 will now be described by way of illustration only and should not be read to limit the scope of the claims.

Figure 3:
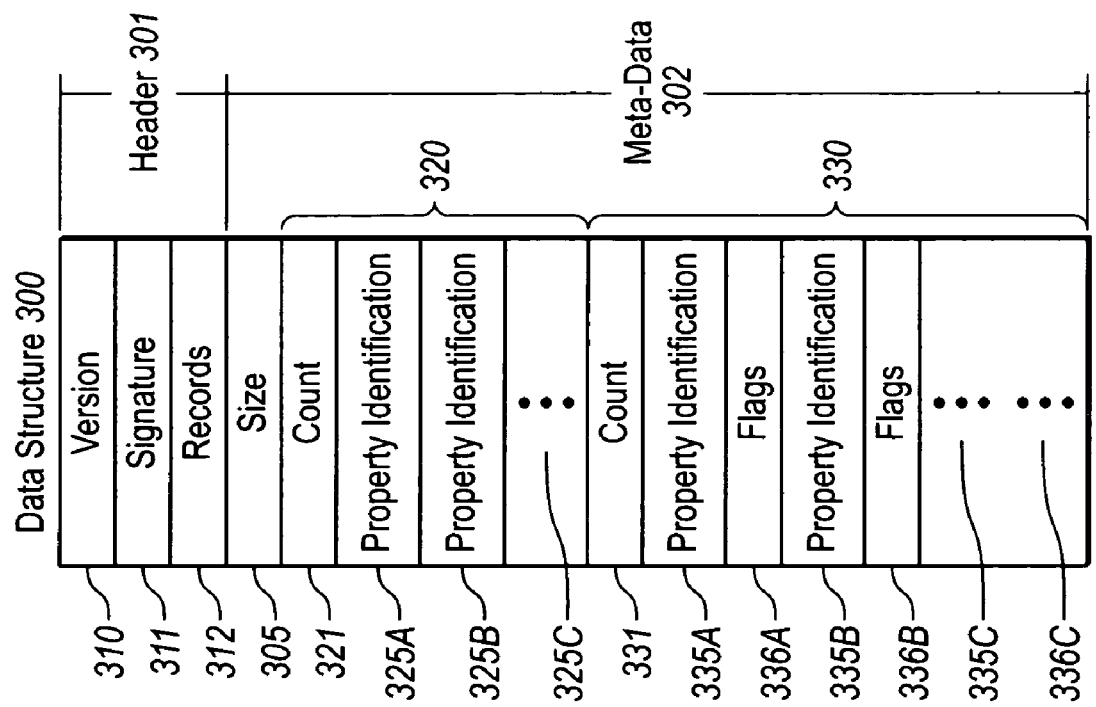
FIG. 3 illustrates a block diagram of a header block and a meta-data block of the data structure of FIG. 2.

FIG. 3 schematically illustrates a data structure 300 that includes a header field 301 and a meta-data field 302. Header field 301 corresponds to header field 201 of FIG. 2. Header field 301 includes three data fields: a version field 310, a signature field 311, and a records field 312.

Version field 310 indicates the update type of address book update data structure 200. For example, a certain integer or flag value may used to indicate that the data structure is a full file update, while a different integer or flag value may be used to indicate that the data structure is an incremental update.

The signature field 311 may be used to perform Cyclic Redundancy Checking (CRC) on the address book data structure 200 to ensure there is no corruption of address book update data structure 200 in transit. This may be accomplished by any CRC method known to one skilled in the art, such as a CRC checksum.

The records field 312 indicates a total count of the address book update records 204 (with the count being perhaps incremented by one to account for the global properties record 203) of the address book data structure 200. This count may be used for memory allocation purposes by a client receiving the data structure.

The following represents an example of a header block 301 that may be used to practice the principles of the present invention, and is provided by way of illustration.

```
struct OAB_HDR {
    ULONG ulVersion; // 32 for full file, 33 for index
    ULONG ulSignature;
    ULONG ulRecords;
};
```

Referring again to FIG. 3, a meta-data field 302 is shown. Meta-data 302 corresponds to the meta-data field 202 of address book update data structure 200. Meta-data field 302 comprises several data fields including configurable lists of attribute property identifications. The first data field, size field 305, indicates the size of meta-data field 302. This size indication may be used by a receiving client also for memory allocation purposes.

Meta-data field 302 includes a first attribute table 320 for global information (hereinafter also referred to as a "global attribute table"). Global attribute table 320 includes a count field 321 that contains a count of the global property identification fields to follow. For example, if there were ten global property identification fields to follow, then the counter field 321 would indicate as such.

Global attribute table 320 also includes a list of configurable property identifications 325A, 325B, and potentially more as depicted by vertical ellipses 325C. The configurable property identifications 325 identify global property types that may be used to specify global information about the entire address book data structure 200. The types of such global information may include, for example, address book name, address book version, or any other information the server may want to pass on to clients outside of an address book entry. The property identifications 325 identify the data that will be contained in the global properties record 203 described below. In addition, the property identifications identify the encoding that may be expected for such global properties. Types of encoding include, for example, Unicode, binary, integers and the like.

The list of global property identifications 325 is configurable. If a new version of the address book uses new global property identifications (e.g. a new CRC mechanism to be applied to the update data structure), these new global properties may be identified in the global attribute table 320. Conversely, if a new version of the address book no longer uses a particular global property, the associated identification may be omitted from the global attribute table 320.

Meta-data block 302 also includes a second attribute table 330 (hereinafter also referred to as "entry attribute table") for address book update records. Entry attribute table 330 includes a count field 331 that represents a count of the property identification. For example, if there were ten property identification fields to follow, then the counter field 331 would indicate as such.

Entry attribute table 330 includes a list of configurable property identifications 335A, 335B, and potentially more as depicted by vertical ellipses 335C. The configurable property identifications 335 represent all possible types of properties that may be included in a fully populated address book entry given the current version of the address book. The property types that may be identified in the entry address book table may include, for example, first name, surname, e-mail address, telephone number, and any other contact information that may be included in the address book entry for the current address book version. The property identifications 335 define a superset of the data that may be contained in the address book record data blocks 204 as will be explained below. The property identifications 335 may also define the encoding type for each of these properties.

As the list of property identifications 335 is configurable, new property identifications may be added and obsolete property identifications may be removed as newer address book versions are introduced to thereby redefine the types of properties that may be included in an address book entry given the current address book version.

Entry attribute table 330 also includes a list of property flags 336A, 336B, and potentially more as depicted by vertical ellipses 336C. Property flags 336 are utilized in some embodiments by a client to index the information in address book data structure 200 when it is received from a server. The client has the ability to index the data in any way that is desirable.

The following represents an example of a meta-data block 302 that may be used to practice the principles of the present invention, and is provided by way of illustration only

```
struct OAB_META_DATA {
    ULONG cbSize;
    OAB_PROP_TABLE hdrAtts;
    OAB_PROP_TABLE oabAtts;
};
struct OAB_PROP_TABLE {
    ULONG cAtts;
    OAB_PROP_REC rgProps [ ];
};
struct OAB_PROP_REC {
    ULONG ulPropID;
    ULONG ulFlags;
}
```

Figure 4:
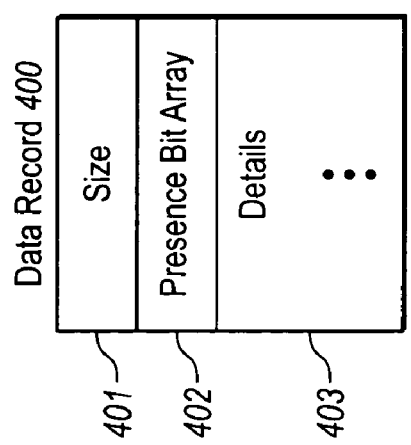
FIG. 4 illustrates a block diagram of a data record block of the data structure of FIG. 2.

Referring to FIG. 4, a block diagram illustrating a data record 400 is depicted. The data record 400 corresponds to both the global properties record 203 and the address book record 204 in address book data structure 200. Data record 400 includes three fields: a size field 401, a presence bit array 402, and a details field 403.

In both the global properties record 203 and the multiple address book update records 204, the size field 401 indicates the size of the data that will follow within that specific record. This may be used by the client for memory allocation purposes.

In addition, in both the global properties record 203 and the multiple address book update records 204, there may be a presence bit array field 402. The presence bit array 402 indicates which specific attributes are present in the details field 403 as will be described in more detail with respect to FIGS. 5 and 7 below. The details field 403 includes the actual attribute data and may be laid out as dictated by the combination of the appropriate attribute table and the presence bit array as will now be described.

As previously indicated, the entry attribute table 330 lists the total set of all possible property identifications for a given version. There may a number of reasons why a particular address book update entry may not have associated property data for any one or more of these corresponding property identifications. For example, perhaps the property data has not changed since the last time the client address book was updated. In that case, there would be no need to include information that was already known to the client. As a specific example, suppose that only the telephone number for a given address book entry has changed. There would be no need in an incremental update to send the first name, surname, and the like for the address book entry, since the client likely already has this information.

Also, perhaps, the server is not capable of maintaining all of the possible property types for a given address book version. For example, entry attribute table 330 may include a property identification for office location, while the server contains no office location data. Since the property identification is present, a blank attribute field would be included in the address book data records 204. If there are many of these blank entries, the address book data records 204 may become unnecessarily large.

In these and similar situations, the presence bit array 402 may be used to significantly reduce the size of the address book update data structure. For example, when the presence bit array 402 is implemented as a bitmap, the presence bit array 402 has one binary value (e.g., a binary one) corresponding to a property identification that has corresponding data in the address book update record. Conversely, the presence bit array 402 has the opposite binary value (e.g., a binary zero) corresponding to a property identification that has no corresponding data in the address book update record. For example, if a property identification called for office location but the server contained no office location data, then a zero would be recorded in the presence bit array 402.

Using the presence bit array 402, the data in either global property record 203 or the address records 204 is laid out in the details field 403 in the order the property identifications are listed in the attribute tables. However, if the presence bit array contains a zero for a property, then no data will be encoded in details field 403 for that property.

Figure 5:
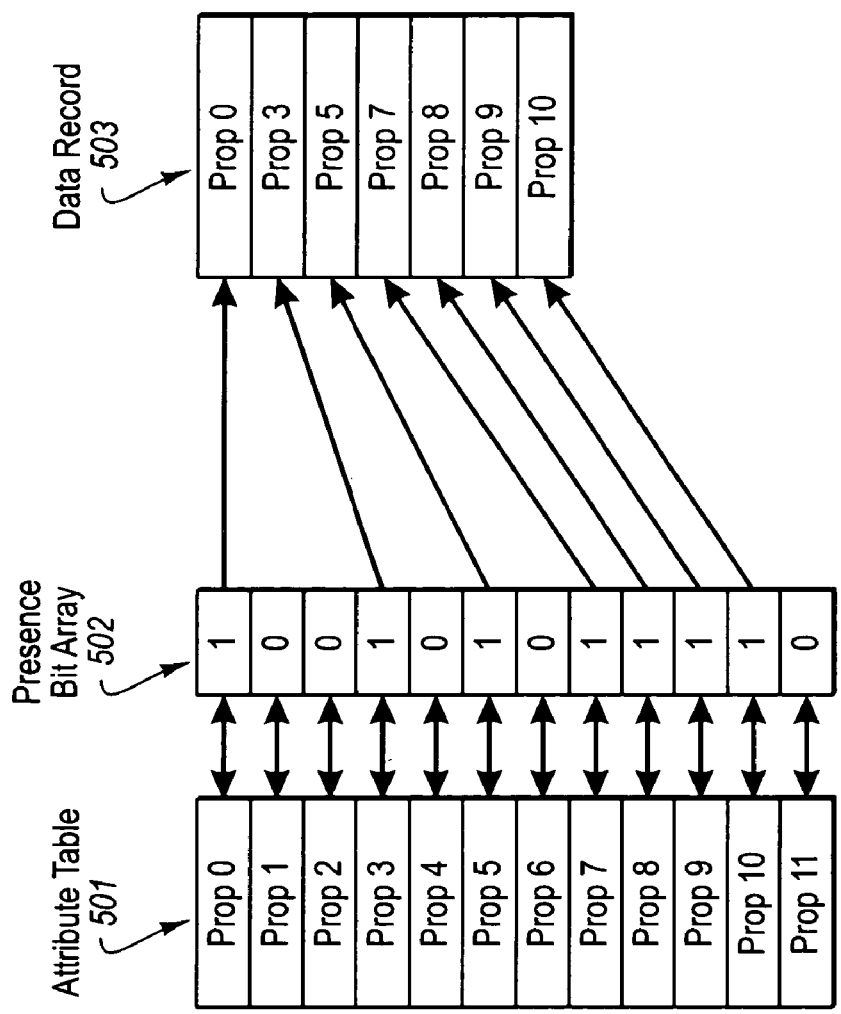
FIG. 5 illustrates a line data structure that indicates which data is included in the data structure of FIG. 2.

Referring to FIG. 5, an illustration of how the bit presence array works can be seen. An attribute table 501, which may correspond to either attribute table 320 or 330, is shown containing 12 property identifications labeled property 0 through 11. In addition, a presence bit array 502 is shown. In the presence bit array, properties 0, 3, 5, 7, 8, 9, and 10 have a one associated with them, indicating that there is data for those properties in the data record. However, properties 1, 2, 4, 6, and 11 have a zero associated with them, indicating that there is no data for those properties in the data record.

The data in the data record 503 is laid out in the order of properties that have an associated one in the presence bit array 502. In FIG. 5, the data record 503 contains properties 0, 3, 5, 7, 8, 9, and 10 in that order as this is the order they are laid out in the attribute table and the presence bit array. In this way, the amount of unnecessary data in the data records may be significantly reduced, and the overall size of address book update data structure 200 may be reduced. The address book update data structure is then sent to a client where it is utilized in the address book update process.

FIG. 7 illustrates a flowchart of a method 700 for a client to interpret the address book update data structure during updating of the address book. For instance, the method 700 may be applied by the interpretation logic 822 of the second computing system 802 to interpret the address book update data structure 831 to thereby update the address book 821. The method may be repeated for each property or each data record in the address book update data structure.

For each property, the client accesses the property data in the data record field (act 701). The client would also access a list data structure that identifies which properties are actually included in the address book update record (act 702). For instance, the presence bit array may be used for this purpose. Which of these acts are performed first is not important to the principles of the present invention.

The client would then use the property information read from the address book update record, and the list data structure to find the property identifications associated with the retrieved property data (act 703). For example, the client reads the presence bit array and determines the location where the next binary one is recorded. From this, the client can find the property identification associated with a one, and by inference, which property identification corresponds to the retrieved data.

Finally, the client uses the property identification and the property data to update the address book (act 704). Knowing the property identifications allows the client to identify the type of data corresponding to the retrieved data. For example, if the data retrieved from the record were "Palmer", the presence bit array may be used to allow the client to determine the type of data that is represented (e.g., first name or surname). The client may then update the appropriate data field that corresponds to that property type in the address book.

Referring back to FIG. 5, a specific example of method 700 will be described. A client would access the property data in record data 503 (act 701). The client would next access presence bit array 502 (act 702). The client would read the presence bit array and find that a one was recorded for properties 0, 3, 5, 7, 8, 9, and 10. The client would use this information to find the property identifications for those properties (act 703). Finally, the client would use the property identifications and property data to complete the update. For example, the client would update the address book entry corresponding to the properties 0, 3, 5, 7, 8, 9, and 10. The method would then be repeated on other address book update records.

Having described the address book data structure 200 in detail, a specific example of a method 600 for a first computing system to generate an address book update data structure will now be described in FIG. 6. The server generation logic, which may correspond to server generation logic 812 in computing system 801 of FIG. 8, identifies all the property attributes that may be included in a fully populated address book entry for specific version of the address book (act 601).

Having identified the property attributes internally, the server generation logic may include a list of attribute identifications corresponding to the identified properties in an attribute table (e.g., the entry attribute table described above) of an address update data structure (act 602) such as the address book update data structure 831 of FIG. 8.

The generation logic may also include contact data records that include some of the identified properties in the address book data structure 831 (act 603). As can be seen in FIG. 6, the order that the generation logic performs acts 602 and 603 is unimportant to the principles of the present invention. The acts may be in parallel or in any sequence that can be performed by the generation logic.

The server finally provides the address book update structure to a second computing system (act 604), which may correspond to second computing system 802 in FIG. 8. The second computing system may then use the received address update data structure to update address book 821. For example, the second computing system may perform the method 700 of FIG. 7.

Accordingly, the principles of the present invention relate to a mechanism for updating an address book. A flexible data structure is used that allows attributes to be added and deleted without having to change the underlying file format. This saves computing resources and time. Accordingly, the principles of the present invention are a significant advancement in the art of updating software address books.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer-storage media for use in a computing environment having thereon computer executable instructions that, when executed by one or more processors of the computing environment, cause the computing environment to perform a method of receiving an address book data structure sent from a first computing system to a second computing system, the method comprising:

receiving the address book data structure at the second computing system, the address book data structure comprising:
  a header field, the header field comprising:
    a version field specifying at least the type of the address book data structure;
    a signature field comprising a signature field cyclic redundancy check (CRC); and
    a records field; and
  a meta-data field, the meta-data field comprising:
    a size field; and
    an entry attribute table, wherein the entry attribute table comprises a list of a plurality of property identifications, the property identifications in the entry attribute table representing each of the properties that would be present in a fully populated address book entry, and wherein the each of the property identifications in the entry attribute table define a particular encoding type for each of the properties;
  one or more address book records; and
  a presence bit array contained within the at least one of the one or more the address records, the presence bit array indicating each property which is identified in the entry attribute table and which is also present in the at least one of the one or more address records and the presence bit array further indicating each property which is identified in the entry attribute table and which is not present in the at least one or more address records; and
calculating a calculated CRC for the address book data structure;
comparing the calculated CRC to the signature field CRC; and
determining from the comparison whether there has been corruption of the address book data structure.

2. The one or more computer-storage media in accordance with claim 1, wherein each of the one or more address book records further comprise a size field and a details field.

3. The one or more computer-storage media in accordance with claim 2, wherein the details field of an address book record comprises a property value for each of the properties identified in the entry attribute table and which is indicated as being present in the address book record by the presence array.

4. The one or more computer-storage media in accordance with claim 1, wherein the entry attribute table includes a count field that represents a count of the property identifications.

5. The one or more computer-storage media in accordance with claim 1, wherein the presence bit array has one binary value corresponding to properties identified in the entry attribute table that has corresponding data in the address book update record.

6. The one or more computer-storage media in accordance with claim 1, wherein if the present bit array contains a zero for a property identifier, then no data will be encoded for that property.

7. The one or more computer-storage media in accordance with claim 1, wherein the presence bit array has one binary value corresponding to properties identified in the entry attribute table that has corresponding data in the address book update record.

8. In a computing network including a first computing system that updates a second computing system using an address book data structure, a method for the first computing system to send an electronic address book to the second computing system, the method comprising:

generating the address book data structure, wherein the address book data structure comprises:
  a header field comprising:
    a version field specifying at least the type of the address book data structure;
    a signature field comprising a signature field cyclic redundancy check (CRC); and
    a records field;
  a meta-data field comprising:
    a size field;
    a global attribute table; and
    an entry attribute table, wherein the entry attribute table comprises a list of a plurality of property identifications, the property identifications in the entry attribute table representing each of the properties that would be present in a fully populated address book entry, and wherein the each of the property identifications in the entry attribute table define a particular encoding type for each of the properties;
  a global properties record;
  one or more address book records; and
  a presence bit array contained within the at least one of the one or more the address records, the presence bit array indicating each property which is identified in the entry attribute table and which is also present in the at least one of the one or more address records and the presence bit array indicating each property which is identified in the entry attribute table and which is not present in the at least one or more address records; and
calculating the CRC and recording the CRC in the signature field; and
providing the address book data structure to the second computing system, including the CRC in the signature field for comparing a second calculated CRC to the CRC in the signature field to determine if the provided address book data structure is corrupted.

9. A method in accordance with claim 8, wherein the presence bit array is a bitmap, with a bit dedicated for each of the properties identified in the entry attribute table and which indicates whether that property is present in the at least one of the one or more address book records.

10. The method in accordance with claim 8, wherein the global properties record and each of the one or more address book records comprise a size field, a presence bit array, and a details field.

11. The method in accordance with claim 10, further comprising identifying each of the properties that would be included in a fully populated address book entry for a specific version of the address book.

12. The method in accordance with claim 10, further comprising recording in an address book record a size, a presence bit array, and a details field, wherein the details field includes property values for a plurality of properties and wherein the presence bit array identifies each of the properties that would be included in a fully populated address book entry which is included in the details field and the presence array identifies each of the properties that would be included in a fully populated address book entry which is not included in the details field.

13. The method in accordance with claim 12, wherein the details field of an address book record comprises a property value for each of the properties identified in the entry attribute table and which is indicated as being present in the address book record by the presence array.

14. The method in accordance with claim 12, wherein the presence bit array has one binary value corresponding to properties identified in the entry attribute table that has corresponding data in the address book update record.

15. In a computing network including a first computing system that updates an address book of a second computing system using an address book update data structure, the address book update data structure including attribute property identifications, a method for the second computing system to update the address book using the address book update data structure, the method comprising:

receiving the address book update data structure, the data structure comprising
   a header field, the header field comprising
      a version field, a signature field wherein the signature field comprises a cyclic redundancy check (CRC), and
      a records field,
   a meta-data field, the meta-data field comprising
      a size field,
      a global attribute table, and
      an entry attribute table,
   a global properties record, and
   one or more address records, and
   wherein the entry attribute table comprises a list of all property types which would be included in a fully populated address book entry of a particular version;
accessing the entry attribute table which identifies each of the properties which would be present in a fully populated address book entry;
accessing at least one of the address records;
accessing property data contained within the at least one address record; accessing a presence bit array contained within the at least one of the address records, the presence bit array indicating each property which is identified in the entry attribute table which is present in the at least one address record and indicating each property which is identified in the entry attribute table and which is not present in the address record;
using the presence bit array to find attribute property information associated with properties which are identified in the entry attribute table and which are indicated as included in the at least one address record;
using the property identifications from the entry attribute table and the associated property information from the at least one address record to update an address book;
the second computing system calculating a calculated CRC for the address book update record;
comparing the calculated CRC to the CRC contained within the signature field; and
determining from the comparison whether there has been corruption of the address book update structure.

16. A method in accordance with claim 15, wherein the presence bit array is a bitmap, with a bit dedicated for each of the properties identified in the entry attribute table and which indicates whether that property is present in the address book record.

17. The method in accordance with claim 15, wherein the property identifications allows the second computer to identify a type of data corresponding to the address book update structure.

* * * * *